April 28, 1931.  J. L. McCOY  1,802,728
SUPERVISORY CONTROL SYSTEM
Filed March 1, 1924   3 Sheets-Sheet 1

INVENTOR
James L. McCoy.

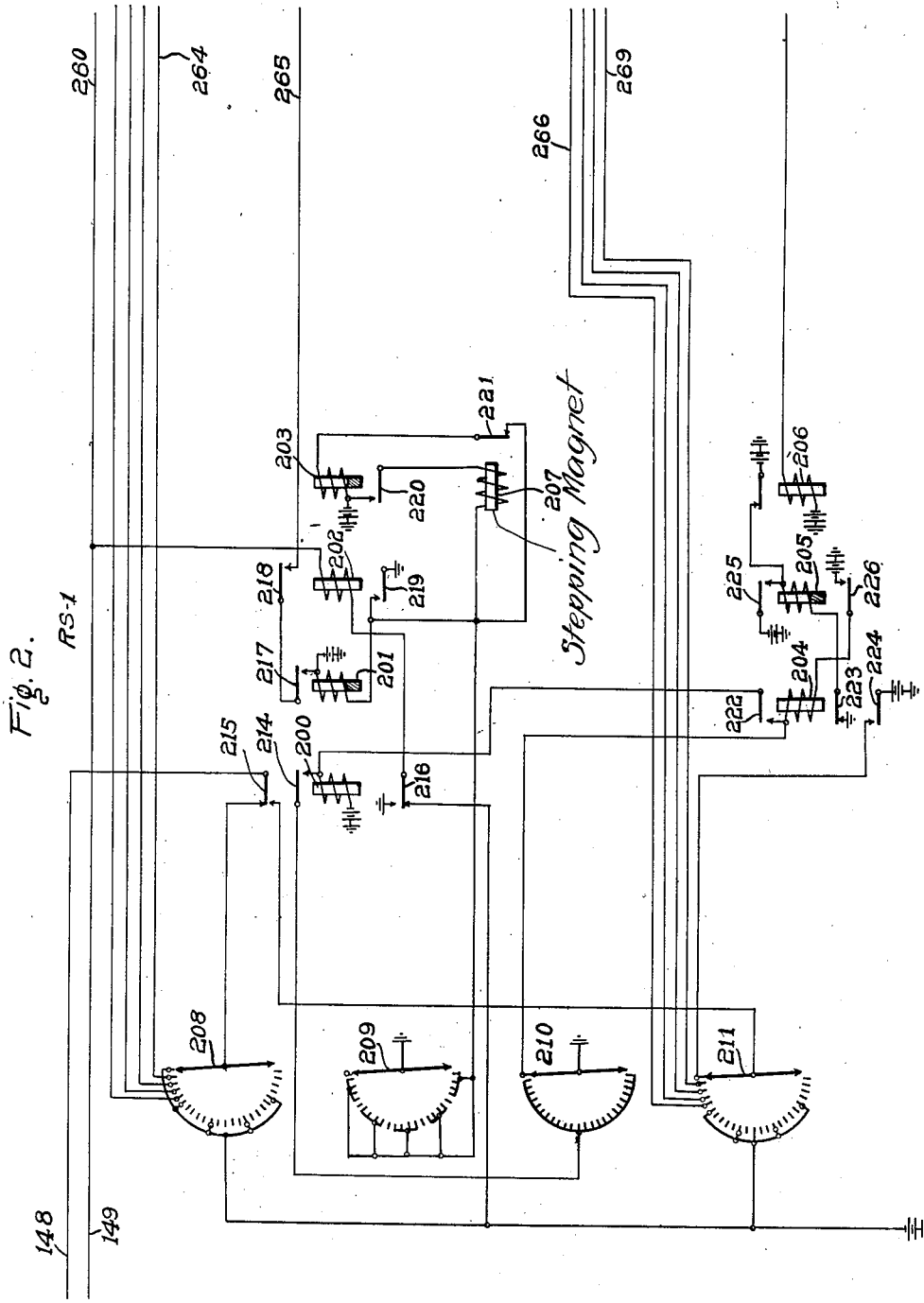

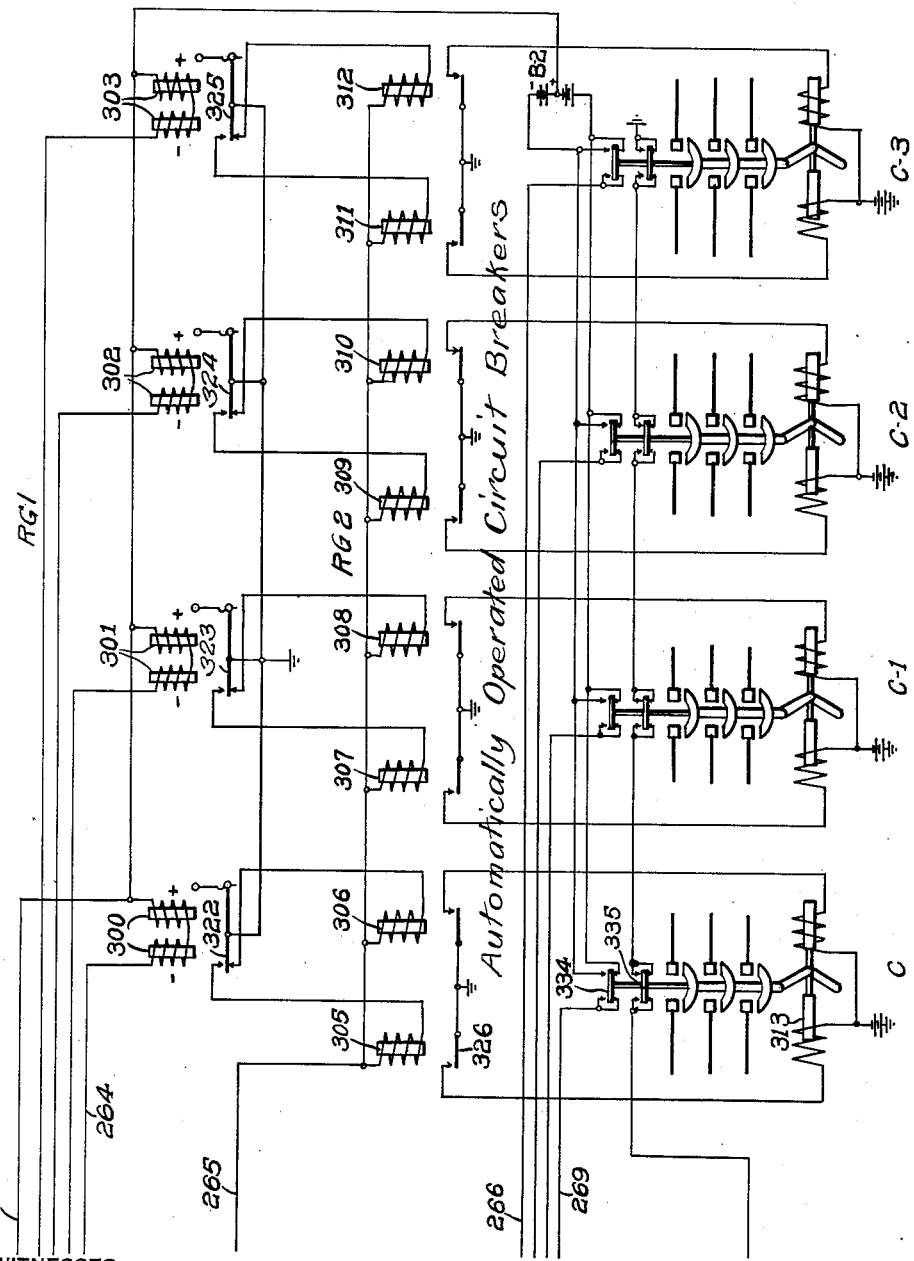

Patented Apr. 28, 1931

1,802,728

UNITED STATES PATENT OFFICE

JAMES L. McCOY, OF WILKINSBURG, PENNSYLVANIA, ASSIGNOR TO WESTINGHOUSE ELECTRIC & MANUFACTURING COMPANY, A CORPORATION OF PENNSYLVANIA

SUPERVISORY-CONTROL SYSTEM

Application filed March 1, 1924. Serial No. 696,179.

My invention relates to systems for supervising and controlling remotely-disposed power apparatus from a central point or dispatcher's office.

One of the objects of the invention is to provide a supervisory control system that shall be inexpensive to manufacture and economical to install.

Another object of my invention is to provide a system for supervising and controlling a remotely-disposed power apparatus from a dispatcher's office by which it is possible to control a plurality of apparatus units during one cycle of the selecting device.

A further object of my invention is to provide a "switch over" means in the selecting devices to cause either one to control the operation of the other selecting device as a receiving device, depending upon whether the dispatcher desires to control a remotely-disposed apparatus unit or the remotely-disposed apparatus unit operates under automatic control.

The above and other objects of the invention will be described hereinafter with reference to the accompanying drawings forming part of this specification.

Referring now to the drawings, comprising Figs. 1, 2 and 3, sufficient circuits and apparatus are shown to enable my invention to be readily explained and understood.

The apparatus and circuits shown in Fig. 1 are those located at the dispatcher's office, while the apparatus and circuits shown in Figs. 2 and 3 are those located at the substation.

In practicing my invention, I provide a selector switch at the dispatcher's office and a selector switch at the substation, these being connected together by a two-wire trunk line. Impulsing circuits are provided whereby the wipers of the selector switches are operated in synchronism. A number of keys is provided at the dispatcher's office, one for each apparatus unit that it is desired to control at the substation. A group of lamps is also provided at the dispatcher's office, two for each apparatus unit at the substation that it is desired to supervise, one lamp for indicating one condition of the unit and the other lamp for indicating the other condition of the unit. I also provide, at the substation, a number of relays for controlling the operation of the apparatus units.

Briefly, the operation proceeds as follows: In the event that the dispatcher desires to operate an apparatus unit, he will throw a key in the desired direction and the previously mentioned impulsing circuits function to cause the switch wipers of the selector switches at the dispatcher's office and substation, respectively, to step or rotate in synchronism.

At a predetermined position of the switch wipers, that is determined by the connections of the key and the apparatus unit, a circuit is completed through the line circuit in such direction as to operate a relay at the substation that, in turn, operates the apparatus unit. The operation of the apparatus unit causes the selector switches to operate through another cycle during which the lamp signals at the dispatcher's office are changed to indicate the operating condition of the predetermined unit. Incidentally, the condition of all the other apparatus units is checked.

In the event that an apparatus unit operates under automatic control at the substation, the answer-back signal that indicates this condition to the dispatcher is sent in a manner similar to that described above.

Referring now more particularly to Fig. 1, keys K, K—1, K—2 and K—3 are ordinary double-throw keys well known in the telephone art. A rotary switch RS has four wipers 131 to 134, inclusive, each of which is adapted to engage a bank of contacts twenty-five in number. The mechanical construction of the switch is similar to that shown in Clement Patent No. 1,107,153. A relay group RG comprises polarized relays for controlling the condition of lamps 139 to 146, inclusive, that indicate the condition of the apparatus units. Polarized relays 119 to 122, inclusive, are so constructed that they are adapted to maintain their armatures in the last position to which they are operated when deenergized. This result is accomplished by a toggle spring illustrated in connection with the relay armatures.

The apparatus at the dispatcher's office is connected to the apparatus at the substation by means of a trunk line comprising trunk conductors 148 and 149.

In Fig. 2, rotary switch RS—1 is similar to the rotary switch RS previously described, having wipers 208 to 211, inclusive, each of which is adapted to engage a set of bank contacts twenty-five in number.

In Fig. 3, the relay group RG—1 comprises polarized relays 300 to 303, inclusive, that are adapted to control the operation of the relays of the relay group RG—2. The relays of the relay group RG—2 control the operation of circuit breakers C, C—1, C—2 and C—3. The polarized relays 300 to 303, inclusive, are constructed in a manner similar to the polarized relays 119 to 122, inclusive. The circuit breakers C, C—1, C—2 and C—3 are of the ordinary construction and are adapted to function at the station in any desired manner.

While, in the drawings, a plurality of batteries have been shown, it will be understood that there are three batteries at each station, one for circuit operation, the other two for signalling. While the batteries for circuit operation have been shown grounded, in practice they are not connected to ground. To distinguish the circuits, the battery at the dispatcher's office has been shown with a solid ground instead of the conventional form.

It will be assumed that the dispatcher desires to operate the circuit breaker C at the substation to closed position. In order to accomplish this result, the dispatcher will operate the key K in the proper direction, thereby forcing the springs 113 and 114 into engagement with their working contacts. By this operation, a circuit is completed extending from battery by way of armature 138 and its back contact, spring 114 of key K and its working contact, armature 111, winding of relay 117, bank contact with which the wiper 133 is in engagement, and said wiper to ground.

The relay 117 is energized over the above circuit and operates, at armature 128, to prepare a locking circuit for itself from ground through battery, armature 138, key K operated to closed position, armature 111 of relay 112 de-energized, winding 117, its armature 128 energized, contacts 2 to 24 and wiper 133 of the bank to ground, to complete a circuit at armature 127 for the relay 118, and to prepare a circuit for the relay 202 at the substation and relay 116 at the dispatcher's office at armature 126.

The relay 118, upon operating, completes a circuit at armatures 129 and 130 extending from battery by way of the front contact and armature 126, bank contact with which wiper 131 is in engagement and said wiper, front contact and armature 130, trunk conductor 148, armature 215 and its back contact, wiper 208, bank contact with which said wiper is in engagement, back contact and armature 216, winding of relay 202, trunk conductor 149, winding of relay 116, and armature 129 and its front contact to ground. The relays 116 and 202 are energized over the above circuit.

The relay 116, upon operating, at armature 125 completes a circuit for the slow-releasing relay 115. The latter relay, upon being energized, at armature 124 establishes a circuit for the motor magnet 123 from ground, battery, armature 124, winding 123, armature 125 to ground. The motor magnet 123, upon being energized, operates to position the pawl of the switch so as to actuate the switch wipers 131 to 134, inclusive, upon its deenergization, and at armature 135 opens the circuit of the slow-releasing relay 115. The slow-releasing relay 115, after an interval of time, deenergizes and opens the circuit of the magnet 123, which is deenergized also to again close the circuit of the slow-releasing relay 115 and to advance the switch wipers 131 to 134, inclusive, one step, into engagement with the next set of bank contacts.

At the substation, the relay 202, upon being energized, at armature 219 completes a circuit for the slow-releasing relay 203 and for the slow-releasing relay 201. The relay 203, upon being energized, at armature 220 establishes a circuit from ground, battery, armature 220, winding 207, armature 219 to ground for the motor magnet 207. The magnet 207, upon being operated, so positions its pawl as to advance the switches 208 to 211, inclusive, upon its deenergization and, at armature 221, opens the circuit of the slow-releasing relay 203. The slow-releasing relay 203 deenergizes after a short interval of time and opens the circuit of the stepping magnet 207 at armature 220. The magnet 207, upon retracting its armatures, advances its switch wipers 208 to 211, inclusive, one step and, at armature 221, closes a circuit for the slow-releasing relay 203.

Upon the advancement of the switch wipers of the selector switch RS at the dispatcher's office and the selector switch RS—1 at the substation into engagement with the second set of bank contacts, the circuit for the relays 116 and 202 is opened and, consequently, these relays deenergize. The retraction of the armature 125 of the relay 116 opens the original energizing circuit of the relay 115, while the retraction of the armature 219 of the relay 202 opens the original energizing circuit of the relay 203.

The relay 115 in the switch RS is operated over a circuit extending from ground by way of wiper 132, bank contact with which said wiper is in engagement, back contact and armature 135; and winding of relay 115 to battery. The relay 115 operates, as before, to complete a circuit for the motor magnet 123. The magnet 123 operates to open the circuit of the slow-releasing relay 115 and also positions the aforementioned pawl. When the slow-releasing relay 115 deenergizes, the circuit of the magnet 123 is opened and the switch wipers 131 to 134, inclusive, are advanced into engagement with the third set of bank contacts. The retraction of the armature 135 also completes a circuit for the slow-releasing relay 115.

At the substation, the slow-releasing relay 203 is energized over a circuit extending from ground by way of wiper 209, the bank contact with which said wiper is in engagement, back contact and armature 221, and winding of relay 203 to battery. The slow-releasing relay 201 is also maintained energized over the above circuit and operates to prepare a circuit for the various relays in the relay group RG—2. The operation of the relay 203 closes a circuit for the stepping magnet 207. The stepping magnet 207 operates to position its associated pawl and to open the circuit of the relay 203.

Upon the deenergization of the relay 203, the circuit of the magnet 207 is opened. By the retraction of the magnet 207, the switch wipers 208 to 211, inclusive, are advanced into engagement with the third set of bank contacts and the circuit of the slow-releasing relay 203 is opened.

While the switch wipers of both selector switches RS and RS—1 are in engagement with the second set of bank contacts, a circuit is completed extending from the negative pole of the battery B, Fig. 1, by way of springs 113 on the key K, the bank contact with which the wiper 131 is in engagement and said wiper, front contact and armature 130, trunk conductor 148, armature 215 and its back contact, wiper 208, the bank contact with which said wiper is in engagement, conductor 264, winding of polarized relay 300, conductor 260, trunk conductor 149, and thence to the positive pole of the battery B. The polarized relay 300 is operated in such direction as to cause its armature 322 to engage its front contact. By this operation, a circuit is prepared for the relay 305.

The rotary switch RS at the dispatcher's office continues to advance its wipers until they are brought into engagement with the sixth set of bank contacts, whereupon the circuit of the slow-releasing relay 115 is opened at the wiper 132.

At the substation, the wipers of the switch RS—1 are advanced until they are brought into engagement with the sixth set of bank contacts, and the circuit of the slow-releasing relay 203 is opened at the wiper 209. During this operation of the selector switches RS and RS—1, the polarized relays 300 to 303 are operated into the proper positions, depending upon the manner in which the keys K, K—1, K—2, and K—3 are thrown.

If the switch wipers 131 to 134, inclusive, engage their sixth set of bank contacts at the same time that the switch wipers 208 to 211, inclusive, engage their corresponding set of bank contacts, a circuit is completed extending from ground by way of front contact and armature 129, winding of relay 116, trunk conductor 149, winding of relay 202, armature 216 and its back contact, bank contact with which wiper 208 is in engagement and said wiper, back contact and armature 215, trunk conductor 148, armature 130 and its front contact, wiper 131, bank contact with which said wiper is in engagement, and thence to battery. The relay 116 of the switch RS now causes the energization of the relay 115 and the consequent operation of the magnet 123.

In like manner, the relay 202 at the substation causes the operation of the slow-releasing relays 201 and 203 and the operation of the magnet 207.

In the event that the switch wipers of the switches RS and RS—1, respectively, do not engage their sixth set of bank contacts at the same time, the above circuit will not be completed and the switch wipers of the switch that is not yet in engagement with the sixth set of bank contacts will operate in the manner described, until engagement is made with such set, whereupon the circuit above described will be completed.

As the proper operation of the system depends upon the synchronous operation of the switch wipers 131 to 134, inclusive, with the switch wipers 208 to 211, inclusive, the slow-releasing relays 115 and 203 are adjusted to give such synchronous operation of their respective magnets 123 and 207.

At the substation, the energization of the relay 202 over the circuit previously described, completes a circuit extending from battery by way of the front contact and armature 217, armature 218 and its front contact, conductor 265, winding of relay 305, front contact and armature 322 to ground. Depending upon the position of the armatures 323 to 325 on the relays 301 to 303, the relays 307 to 312 are operated. As before explained, the position of the armatures of the polarized relays depends upon the position of the corresponding keys at the dispatcher's office.

The relay 305, upon being energized, at armature 326 establishes a circuit for the closing coil 313 of the circuit breaker C. By this operation, the power circuits are changed in the manner described and, also, the circuit of the normally energized relay 206 is momentarily opened at the contacts 335. By reason of the opening of the circuit of the relay 206, this relay is momentarily deenergized to complete a circuit for the slow-releasing relay 205. The latter relay operates to establish a locking circuit for itself at armature 225 and to prepare a circuit, at armature 226, for the relay 204.

The switch wipers 131 to 134, inclusive, of the rotary switch RS continue to be advanced under the control of the slow-releasing relay 115 until such wipers are brought into engagement with the eleventh set of bank contacts, whereupon the operation of the magnet 123 ceases until the circuit of the relay 116 is completed.

In a like manner, the switch wipers 208 to 211, inclusive, of the rotary switch RS—1 are advanced under the control of the slow-releasing relay 203, until such wipers are brought into engagement with the eleventh set of bank contacts.

During this operation of the switch wipers, the controlling impulses from the batteries B and B—1 are sent out, depending upon the position of the keys, and the polarized relays associated with the apparatus units are operated. These last operations take place in substantially the same manner as has been before described.

When the switch wipers of the rotary switches RS and RS—1 are brought into engagement with the eleventh set of bank contacts, the relays 116 and 202 are again energized. As a result of this operation, the independent rotary operations of the switches are again started and a circuit is completed for operating the relays of the relay group RG—2, in the manner described, so that the circuit breakers or apparatus units associated with these relays are operated.

The operation of the rotary switches RS and RS—1 continues in the manner described until the switch wipers are brought into engagement with the first set of bank contacts. When the switch wipers of the rotary switch RS are in engagement with their twenty-fifth set of bank contacts, the locking circuit of the relay 117 is opened and a circuit is completed, at wiper 133, for the slow-releasing relay 112. The latter relay, upon being energized, at armature 111 opens another point in the circuit of the relay 117 to permit this relay to deenergize. The relay 117, upon being deenergized, opens the circuit of the relay 118 at armature 127, and at armature 126 opens one point in the circuit of the relays 116 and 202. The relay 118, upon being deenergized, opens another point in the circuit of the relays 116 and 202 and prepares a circuit at the back contacts of the armatures 129 and 130 for the relays 116 and 202.

At the substation, the engagement of the wiper 210 with the first bank contact completes a circuit for the relay 204 from ground, wiper 210, first contact of the bank, winding 204, armature 226 of relay 205 energized, battery to ground and this relay is operated to establish a circuit for the relay 200 at armature 222, to open the circuit of the slow-releasing relay 205 at armature 223 and to prepare an impulsing circuit at armature 224.

The relay 200, upon being energized, prepares a locking circuit for itself at armature 214 from ground, wiper 210, contacts of the banks 2 to 25, armature 214 of relay 200 energized, winding of relay 200 battery to ground and completes a circuit, at armatures 215 and 216, extending from ground by way of front contact and armature 216, winding of relay 202, trunk conductor 149, winding of relay 116, armature 129 and its back contact, bank contact with which wiper 134 is in engagement, said wiper, back contact and armature 130, trunk conductor 148, armature 215 and its front contact, wiper 211, bank contact with which said wiper is in engagement, and front contact and armature 224 to battery. The relays 116 and 202 are energized over the above circuit.

The relay 202, upon being operated, at armature 219 completes a circuit for the slow-releasing relays 201 and 203 in multiple. The operation of the relay 201 is without particular function at the present time. the relay 203, upon operating, at armature 220 completes a circuit for the stepping magnet 207. The stepping magnet 207 operates to place its associated pawl in position to actuate the switch shaft carrying the switch wipers 208 to 211, inclusive, upon its deenergization, and opens the circuit of the slow-releasing relay 203 at armature 221.

After a short interval of time, the relay 203 is deenergized and the circuit of the magnet 207 is opened. The retraction of the armature of the magnet 207 causes the wipers 208 to 211, inclusive, to be advanced into engagement with the next set of bank contacts and the energization of the slow-releasing relay 203.

At the dispatcher's office, the operation of the relay 116 closes a circuit for the slow-releasing relay 115 at armature 125. The relay 115, upon being operated, at armature 124 completes a circuit for the stepping magnet 123. The magnet 123 operates to open the circuit of the slow-releasing relay 115 to position its pawl. When the slow-releasing relay 115 is deenergized, the stepping magnet circuit is opened and the magnet is deenergized. The retraction of the armature of the magnet 123 causes the circuit of the relay 115 to be closed and the switch wipers 131 to 134, inclusive, to be advanced into engagement with the second set of bank contacts. By the operation of the switch wipers 131 to 134, inclusive, into engagement with the second set of bank contacts, the original energizing circuit of the relay 117 is opened at the wiper 133 and, consequently, when the slow-releasing relay 112 is deenergized, the relay 117 is not again operated.

The operation of the wipers 208 to 211, inclusive, of the rotary switch RS—1 into engagement with their second set of bank contacts opens the circuit for the relays 116 and 202. These relays are, consequently, deenergized to open the original energizing circuits of the relays 115 and 203.

The relay 115 of the rotary switch RS is now operated over a circuit extending from ground by way of wiper 132, bank contact with which said wiper is in engagement, back contact and armature 135, winding of relay 115, and to battery. The slow-releasing relay 115 operates to energize the magnet 123.

The slow-releasing relay 203 of the rotary switch RS—1 is energized over a circuit extending from ground by way of wiper 209, bank contact with which said wiper is in engagement, back contact and armature 221, and winding of relay 203 to battery. The relay 203, upon being energized, closes a circuit for the stepping magnet 207.

The wipers 131 to 134, inclusive, of the rotary switch RS and the wipers 208 to 211 of the rotary switch RS—1 are advanced in a manner similar to that before described until they are brought into engagement with the sixth set of bank contacts. In this position, the circuits of the slow-releasing relays 115 and 203 are opened and the relays 116 and 202 must be energized over the trunk circuit, whereupon the stepping action takes place in the same manner as before.

During the stepping operation of the switch wipers, supervisory indications are sent back to the dispatcher's office in the following manner. When the switch wipers of the switches RS and RS—1 are in their second position, a circuit is completed extending from the negative pole of the battery B—2 at the substation by way of the contacts 334 controlled by the circuit breaker C, conductor 269, bank contact with which wiper 211 is in engagement, said wiper, front contact and armature 215, trunk conductor 148, armature 130 and its back contact, wiper 134, bank contact with which said wiper is in engagement, winding of polarized relay 122, trunk conductor 149, conductor 260 and to the positive pole of the battery B—2. The polarized relay 122 operates its armature 138 into engagement with its front contact, whereby a circuit is established for the supervisory lamp 145 and the circuit of the supervisory lamp 146 is opened.

This change in supervisory signals serves to inform the dispatcher that the desired operation of the circuit breaker C has occurred at the substation. An additional result of the operation of the armature 138 of the relay 122 is that the original energizing circuit of the relay 117 is opened.

The sending back of other supervisory signals takes place in the same manner as described, the position of the circuit breakers, such as C, C—1, C—2 and C—3, etc., being checked during one revolution of the wipers of the switches RS and RS—1.

The wipers of the rotary switches RS and RS—1 continue to be advanced in the same manner as before described until they are brought into engagement with their first set of bank contacts.

At the substation, as a result of the switch wipers being brought into engagement with their first set of bank contacts, the locking circuit of the relay 200 is opened at 210 and this relay is deenergized to open the circuit of the relays 202 and 116. The rotation of the wipers of the switches RS and RS—1 now ceases in view of the fact that the proper circuit breaker has been operated and an answer-back signal has been obtained indicating such operation.

It will be obvious that the dispatcher may control, during one revolution of the switch wipers, as many apparatus units as he desires and, upon the next revolution of the switch wipers, supervisory indications showing the operation of the apparatus units will be sent back.

In the event that the apparatus unit does not function or that the proper supervisory signal is not returned, the operation will continue in the manner described until the proper action takes place, in view of the fact that, unless the supervisory control relay, such as 122, is operated in the proper manner, the relay 117 will be again energized as the keys K, K—1, K—2 and K—3 remain in the positions last operated.

In the event that one of the units operates automatically, the circuit for relay 206 is momentarily opened to complete an energizing circuit for the relay 205. Relay 205, upon energization, locks itself over armature 225 and, at armature 226, completes an energizing circuit for the relay 204 which opens the locking circuit of the relay 205 at armature 223, extends an energizing circuit for relay 200 over armature 222 and, at armature 224, completes a circuit over the armature 215 and conductor 148, the contact of the armature 130 switch wiper 134, back contact and armature 129 to the relay 116 and back over conductor 149, through relay 202 and armature 218 and its front contact, to ground. The relays 202 and 116, upon energization, control their stepping magnets in the manner described above, for stepping the switches from contact to contact until the contact individual to the particular operated circuit breaker is reached. In the present case, it will be assumed that the breaker C₃ has operated. This breaker is associated over its pallet contact and conductor 266 with the fourth contact on switch 211. When the wiper reaches this contact, therefore, a circuit is completed from the battery B₂ over the upper portion thereof, the upper contact of the pallet switch, conductor 266, to the fourth contact of the bank 211 and the wiper thereon, front contact and armature 215, conductor 148 and the relay 119 connected to the fourth contact, the wiper of bank 134 being assumed to be on the fourth contact at that time, over conductor 149, and conductor 260 back to the other side of battery. In this manner, upon an automatic operation of any one of the units, the associated polar relay operates which in turn, operates the armature 135 for operating the lamp 139 and opening the circuit of the lamp 140.

My invention is not limited to the particular arrangement of the apparatus illustrated, but may be variously modified without departing from the spirit and scope of my invention, as set forth in the appended claims.

I claim as my invention:

1. In an electrical control system, the combination with a first station, a second station, apparatus units in said second station, and signalling devices in said first station, of a selecting device at said first station and second station respectively, means controlled from said first station for initiating the operation of said devices, controlling means for maintaining said devices in synchronism, means controlled from said first station for causing said devices to operate one of said units, means responsive to the operation of the unit for thereafter causing said selecting devices to operate one of the signaling devices to indicate the operation of the operated unit, and means responsive to the operation of the signalling device for stopping the operation of the selecting devices.

2. The combination with a first station, a second station, apparatus units in said second station and signalling devices in said first station, of a selecting device at said first station and second station respectively, wipers for each of said devices, a set of contacts for each of said wipers, means controlled from said first station for initiating the operation of the wipers of said devices, control means for maintaining the wipers of said devices in synchronism, means including said devices for selecting any one of said units, means responsive to the operation of said unit for causing said devices to operate one of said supervisory signalling devices to indicate the operation of the operated unit, and means responsive to the operation of the operated unit for stopping the movement of said wipers.

3. In an electrical control system, the combination with a first station, a second station, apparatus units in said second station, and signalling devices in said first station, of a selecting device at said first and second stations respectively, means controlled from said first station for initiating the operation of said devices, controlling means for maintaining said devices in synchronism, means controlled from said first station for causing said devices to operate one of said units, means controlled by said unit for thereafter causing said selecting devices to operate one of said signalling devices to indicate the operation of the operated unit, means responsive to the operation of the signalling device for stopping the operation of the selecting devices, and circuit arrangements for continuing the operation of said selecting devices until the proper signalling device has been operated.

4. In a supervisory control system, a first station, a second station, a signalling line connecting said stations, apparatus units including supervisory contacts normally disconnected from said signalling line at said second station, signalling devices individual to said apparatus units at said first station, synchronously operating selecting apparatus at said first and said second stations, means including said selecting apparatus and said signalling line for selectively operating one of said apparatus units from said first station, means responsive to the operation of said apparatus unit for switching said signalling line to connect with the supervisory contacts of said apparatus unit, and means including said selecting apparatus, said supervisory contacts and said signalling line and responsive to the operation of said apparatus unit for operating a signalling device individual to said unit.

5. In a supervisory control system, a first station, a second station, apparatus units at said second station, signalling devices individual to said apparatus units at said first station, a signalling line connecting said stations, transmitters including distributors at said first and said second stations, receivers including distributors at said first and said second stations, means whereby said signalling line is normally connected to said receivers at said first and said second station, means at said first station for switching said signalling line from said receiver to said transmitter thereat, means including said signalling line and said receiving distributors at said second station for selectively operating one of said apparatus units, means responsive to the operation of said apparatus unit for switching said signalling line from said receiver to said transmitter at said second station, means following the selective operation of said unit for restoring the connection of the signalling line to the receiver at the office, and means including said distributor at said first station for selectively operating one of said signalling devices responsive to the operation of said apparatus unit.

6. In a supervisory control system, a first station, a second station, apparatus units at said second station, signalling devices individual thereto at said first station, normally non-operating selecting devices at said first and said second stations, means for starting said selecting devices into operation and for selectively operating one of said apparatus units from said first station, means responsive to the operation of said apparatus unit and including said selectors for selectively operating one of said signalling devices, and means whereby said selecting devices continue in operation until said signalling device correctly operates.

7. In a supervisory control system, a first station, a second station, apparatus units at said second station, signalling devices at said first station individual to said apparatus units, synchronous distributors at said first and said second stations in a normally non-operating condition, means for starting said distributors into operation, means including said synchronous distributors for directly operating said apparatus units selectively from said first station, means including said distributors for directly operating said signalling devices responsive to the operation of said apparatus units and means whereby said distributors continue in operation until signalling devices are correctly operated in accordance with the operation of the apparatus units.

In testimony whereof, I have hereunto subscribed my name this 26th day of February, 1924.

JAMES L. McCOY.